United States Patent Office
3,773,950
Patented Nov. 20, 1973

3,773,950
USE OF 2,3-DIHYDRO-1-OXO-1H-PYRROLO[3,4-b]-QUINOXALINE - 4,9 - DIOXIDES AS ANIMAL GROWTH PROMOTANTS
Timothy Henry Cronin, Niantic, and Philip Dietrich Hammen, East Lyme, Conn., Elie Abusanab, Peace Dale, R.I., and Marwan Jawdat Abu el-haj, Groton, Conn., assignors to Pfizer Inc., New York, N.Y.
No Drawing. Original application Apr. 3, 1970, Ser. No. 25,543. Divided and this application Mar. 17, 1972, Ser. No. 235,791
Int. Cl. A61k 27/00
U.S. Cl. 424—250                8 Claims

ABSTRACT OF THE DISCLOSURE 3-halomethyl-2-quinoxalinecarboxylic acid, alkyl ester 1,4-dioxides useful as antibacterial agents are converted, on treatment with ammonia and amines to 2,3-dihydro-1-oxo-1H-pyrrolo[3,4-b]quinoxaline-4,9-dioxides also useful as chemotherapeutic agents and in promoting growth and improving feed efficiency of animals, in general.

CROSS-REFERENCE TO RELATED APPLICATIONS

This application is a divisional copending application Ser. No. 25,543, filed Apr. 3, 1970.

BACKGROUND OF THE INVENTION

This invention relates to quinoxaline-di-N-oxides, and more particularly to a unique series of 3-halomethyl-2-quinoxalinecarboxylic acid, alkyl ester 1,4-dioxides, useful as antibacterial agents and intermediates, and to 2,3-dihydro-1-oxo-1H-pyrrolo[3,4-b]quinoxaline-4,9-dioxides, the cyclization products of said halomethyl esters with ammonia and amines, also possessing antibacterial activity against pathogenic micro-organisms and to methods for the promotion of weight gain and food consumption in animals.

Continuing efforts to discover new and more useful antibacterial agents have led, over the years, to the development of a wide variety of prototype organic compounds including numerous congeners of quinoxaline-di-N-oxides. Landquist et al., J. Chem. Soc., 2052 (1956), in a search for compounds of improved antibacterial or antiprotozoal activity, reported the preparation of several derivatives of 2-methyl- and 2,3-dimethyl-quinoxaline-di-N-oxides in which the methyl groups were converted to groups such as bisbromomethyl-, acetoxymethyl- and hydroxymethyl including 3 - methyl-2-carbethoxyquinoxaline-di-N-oxide. However, no utility is alleged for any of these compounds. French Pat. M3,717, granted Jan. 3, 1966, discloses 2-quinoxalinecarboxamide-di-N-oxides in which the carboxamide group may be substituted with an alkyl, substituted alkyl, aryl, cycloalkyl, aralkyl, or cycloalkyl group.

Belgian Pat. 697,976, granted Nov. 3, 1967, describes a variety of N-substituted derivatives of 3-methyl-2-quinoxalinecarboxamide-di-N-oxide in which the N-substituent is phenyl, substituted phenyl, dodecyl or ethyl, as well as the corresponding 3-methyl-2-carbethoxyquinoxaline-di-N-oxide. They are said to be of value as intermediates for the preparation of vegetation protection agents and pharmaceutical agents. Belgian Pats. 721,724; 721,725; 721,-727 and 721,728; published Apr. 2, 1969, describe a variety of N-substituted 3-methyl-2-quinoxalinecarboxamide-di-N-oxide derivatives wherein the N-substituent is a hydroxyalkyl, lower alkoxyalkyl, carboalkoxyalkyl, monoalkylaminoalkyl or di(alkyl)aminoalkyl group as antibacterial agents, and include 3-chloromethyl- and 3-bromomethyl-2-quinoxalinecarboxamide-1,4-dioxides.

SUMMARY OF THE INVENTION

The novel antibacterial and growth promotant quinoxaline-di-N-oxides of this invention are represented by the formulae:

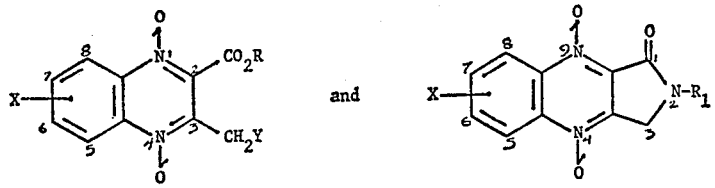

wherein

X is a substituent at the 6- or 7-position consisting of hydrogen, fluorine, chlorine, bromine, trifluoromethyl, methyl or methoxy;
R is alkyl containing from 1 to 3 carbon atoms;
$R_1$ is hydrogen or alkyl containing from 1 to 3 carbon atoms; and
Y is bromine or chlorine.

Of particular interest, because of their in vitro antibacterial activity and as intermediates, leading to congeners of Formula II, are compounds of Formula I wherein R is alkyl containing up to 3 carbon atoms, X is hydrogen and Y is chlorine or bromine, and of Formula II wherein X is hydrogen and $R_1$ is hydrogen or methyl. Compounds of particular interest because of their activity as in vitro and in vivo antibacterial agents, as well as animal growth promotant activity are those of Formula II wherein X is hydrogen and $R_1$ is hydrogen or methyl.

DETAILED DESCRIPTION OF THE INVENTION

In accordance with the process employed for preparing the 3-halomethyl-2-quinoxalinecarboxylic acid, alkyl esters of the present invention, an appropriately substituted 3-methyl-2-quinoxalinecarboxylic acid, alkyl ester 1,4-dioxide is halogenated employing molecular bromine or chlorine.

In practice, compounds of Formula I are prepared by adding an equimolar amount, plus as much as a 10% excess, of the halogenating agent, dissolved in a reaction-inert solvent such as methylene chloride, or chloroform, to the requisite 3-methyl-2-quinoxalinecarboxylic acid, alkyl ester 1,4-dioxide dissolved in a highly polar, water miscible reaction-inert solvent, e.g., dimethylformamide. It is preferred that the reaction mixture be preheated from 75–100° C. before the addition of the halogenating agent. Further, it is advantageous to add said agent at a moderately active rate. The reaction is brought to completion by further maintaining the temperature at approximately 90° C. for an additional 30 minutes.

A convenient work-up of the aforedescribed reaction consists of dilution with ice and water, followed by filtration of the crystallized product. The product may be recrystallized from or triturated with an appropriate solvent.

The requisite 3-methyl-2-quinoxalinecarboxylic acid, alkyl esters 1,4-dioxides employed in the aforementioned reaction are most conveniently prepared by contacting an appropriately substituted benzofuroxan and an alkyl acetoacetate as follows:

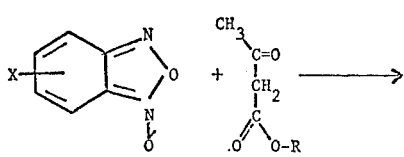 + 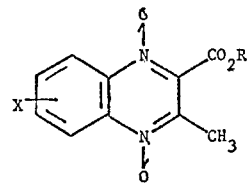 → uct formation results because of the two orientation possibilities of the acetoacetate fragment in the final product.

As a necessary element of the herein described process, the reaction sequences described above are effected in the presence of a base. Such a base is of varied character. For instance, it is meant to contemplate such bases as organic amines, ammonia, alkali metal hydroxides, hydrides and alkoxides. Representative of such bases are ammonia, primary amines such as n-propylamine, n-butylamine, aniline, cyclohexylamine, benzylamine, p-toluidine, ethylamine, octylamine; tertiary amines such as diethylaniline, N-methylpyrrolidine, N,N-dimethylpyrimidine, N - methylmorpholine, and 1,5 - diazabicyclo-[4,3,0]-5-nonene; sodium hydroxide, potassium hydroxide, ammonium hydroxide, sodium ethoxide, potassium methoxide, and sodium hydride. The preferred base to use is an organic amine, ammonia or alkoxide.

In practice, a solution or suspension of the appropriately substituted benzofuroxan and the requisite acetoacetate in a reaction-inert solvent such as ethanol, N,N-dimethylformamide, benzene, tetrahydrofuran, chloroform or hexamethylphosphoramide is treated with an alkoxide, e.g., sodium ethoxide. It is preferable to use at least an equimolar amount of the benzofuroxan and acetoacetate, while the amount of base may be from a catalytic to an equimolar amount. The reaction is carried out at ambient temperatures, although it may be heated to 100° C. to hasten product formation. Reaction time is not critical, but will vary depending on the reactivity of the starting materials, temperature and solvent employed. Substantial yields of the desired products are isolated with reaction periods of 15 minutes to 24 hours.

The requisite benzofuroxanes and acetoacetates are either readily available or easily prepared by those skilled in the art. For instance, the synthesis of variously substituted benzofuroxans is described by Kaufman et al., in Advan. Heterocyclic Chem., 10, 1 (1969). Acetoacetates are readily prepared from diketene according to the general procedure of Kimel et al., J. Am. Chem. Soc., 65, 1995 (1943).

Quinoxalone-di-N-oxides result from the condensation of benzofuroxan and substituted benzofuroxans with acetoacetic esters, such that the 2- and 3-positions of the resulting annellated structure represent the carbonyl carbon and the carbon of the active methylene group of the acetoacetate.

The substituents on the benzene moiety of the 3-methyl-2-quinoxalinecarboxylic acid ester-1,4-dioxides can vary widely. For example, at least one of the following substituents can be present: hydrogen, methyl, methoxy, chloro, fluoro, bromo and trifluoromethyl. The favored positions on the fused benzene ring of said final products are the 6- or 7-positions. The favored positions for substituents on the aryl ring of the starting benzofuroxans leading to said final products are the 5- or 6-positions. When one of said substituted benzofuroxans is condensed with the requisite acetoacetate, a 6- and 7-substituted quinoxaline-di-N-oxide are produced. This multiple prod- For example, if one reacts a 5-substituted benzofuroxan of the formula:

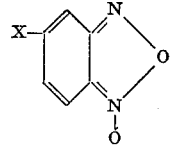

with a reactant $CH_3COCH_2CO_2R$, two products, a 6- and 7-substituted quinoxaline-di-N-oxide, result as shown by the formulae:

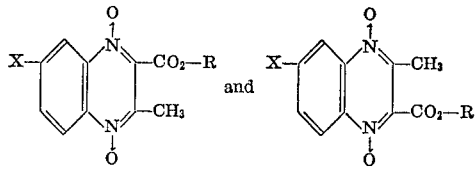

If the corresponding 6-substituted benzofuroxan is employed as the starting material, the same two possible products are formed.

The mixture of isomers is recovered by methods known to those skilled in the art. In many of the preparations disclosed wherein a solid, often crystalline material, separates from the reaction mixture, the solid appears to consist predominantly of of one of the isomers. Said isomer can be purified by repeated recrystallization from a suitable solvent to a constant melting point. The other isomer, the one present in smaller amounts in the originally isolated solid material, is the predominant product in the mother liquor. It can be recovered therefrom by methods known to those skilled in the art, as for example, the evaporation of the mother liquor and repeated crystalization of the residue to a product of constant melting point. Alternatively, the reaction mixture can be extracted either before or after evaporation to dryness.

Although said mixtures may be separated by methods known to those skilled in the art, for practical reasons it is advantageous to use said mixtures as they are isolated from the reaction. Further, it is frequently advantageous to purify these mixtures of isomers by at least one recrystallization from an appropriate solvent or by trituration in an appropriate solvent. Said recrystallization or trituration thus allows the separation of the mixture of positional isomers from such extraneous materials as starting material and undesirable by-products.

The identification of the isomers has not been completed. Both isomers of a given compound, however, exhibit the same type of activity, e.g., as antibacterial agents or as growth promotants.

Products of the instant invention of Formula II are prepared by the reaction of the aforedescribed 3-halomethyl-2-quinoxalinecarboxylic acid, alkyl ester-1-4 dioxides of Formula I with a namine of the formula $R_1NH_2$, wherein $R_1$ is as previously described.

In practice, the 3 - halomethyl - 2-quinoxalinecarboxylic acid, ester 1,4-dioxide dissolved in a reaction-inert solvent such as acetonitrile, dimethylformamide, tetrahydrofuran or hexamethylphosphoramide, and cooled to 10–15° C. is treated with at least two moles of the requisite amine, and as much as a ten fold excess. Instances wherein amine is ammonia or methylamine, said amine may be bubbled into the reaction media. The reaction is carried out at temperatures of 0–50° C. with a preferred range of 15–25° C. and for a reaction time of a few minutes to 6 hours.

A convenient work-up procedure consists of filtration of the precipitate, followed by a water slurry, filtration and drying. Alternatively, the reaction mixture may be poured into water and the resulting precipitated product filtered.

As will be appreciated, the aforedescribed reaction leading to 2 - substituted - 2,3 - dihydro - 1 - oxo-1H-pyrrolo-[3,4-b]quinoxaline-4,9-dioxides may be carried out with a wide variety of amines, including alkyl-, and substituted alkylamines wherein said substituent is hydroxy, alkoxy, cycloalkyl, aryl, dialkylamino, carboalkoxy, carboxamido and polyfluoroalkyl as well as aryl-, cycloalkyl-, alkenyl- and bibycloalkyl amines. All these compounds are considered within the scope of said invention.

An alternate synthetic route leading the products of this invention of Formula II consists of the condensation of a requisite benzofuroxan and an appropriately substituted 3-hydroxy-3-pyrrolin-5-one as follows:

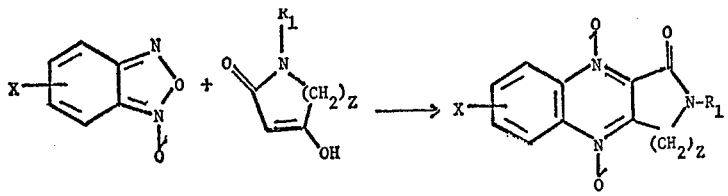

The synthetic procedure encompasses, in general, the same reaction conditions utilized in the preparation of the aforedescribed 3 - methyl - 2-quinoxalinecarboxylic acid, alkyl ester, and comprises treating an equimolar mixture of the requisite benzofuroxan and pyrrolin-5-one in a suitable solvent, e.g., ethanol, with a base selected from the aforementioned group. The amount of said base may be from a catalytic to equimolar amount. The reaction is carried out at room temperature, although it may be heated to approximately 100° C. to hasten product formation. Reaction time will vary from about 20 minutes to 24 hours depending on reactivity of starting materials, solvent and reaction temperature.

Reaction products from both described synthetic routes are identical in every respect when compared by melting point, infrared spectroscopy, mass spectroscopy and nuclear magnetic resonance spectroscopy.

Further, this alternate procedure is employed for the preparation of those compounds within the purview of this invention related to II wherein the fused five membered ring is expanded to a six or seven membered structure as follows:

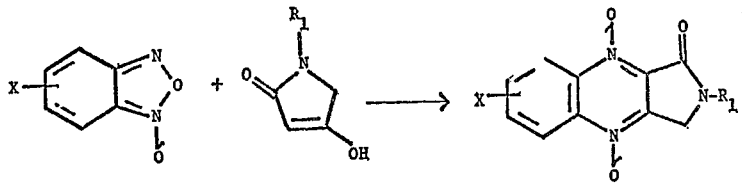

wherein X and $R_1$ are as previously indicated and Z is an integer of 2 or 3.

As previously indicated, the quinoxaline-di-N-oxides of the present invention are readily adapted to therapeutic use as antibacterial agents and as intermediates leading to chemotherapeutic products. Typical member compounds of interest as in vitro antibacterial agents and as intermediates in this series include 3-chloromethyl-2-quinoxalinecarboxylic acid, ethyl ester, 1,4-dioxide and 3-bromomethyl-2-quinoxalinecarboxylic acid, ethyl ester, 1,4-dioxide. Members of interest as in vitro and in vivo antibacterial agents, as well as animal growth promotants are 2,3-dihydro-1-oxo - 1H - pyrrolo[3,4-b]quinoxaline-4,9-dioxide and 2-methyl-2,3-dihydro-1-oxo-1H-pyrrolo[3,4-b]quinoxaline-4,9-dioxide.

The valuable products of this invention of Formulae I and II are remarkably effective in treating a wide variety of pathogenic micro-organisms. They are, therefore, useful as industrial antimicrobials, for example, in water treatment, slime-control, paint preservation and wood preservation as well as for topical application purposes as distinfectants.

For in vitro use, e.g., for topical application, it will often be convenient to compound the selected product with a pharmaceutically-acceptable carrier such as vegetable or mineral oil or an emollient cream. Similarly, they may be dissolved or dispensed in liquid carriers or solvents such as water, alcohol, glycols or mixtures thereof or other pharmaceutically acceptable inert media, that is, media which have no harmful effect on the active ingredient. For such purposes, it will generally be acceptable to employ concentrations of active ingredients of from about 0.01 percent to about 10 percent by weight based on total composition.

In determining the in vitro activity of an antibotic, the sensitivity of the various micro-organisms is determined by the commonly accepted two fold serial dilution technic. Final concentrations of compound per ml. range from 100 mcg. in the first tube to 0.19 mcg. in the tenth tube. The inoculum consists of 0.5 ml. of a $1 \times 10^{-3}$ dilution of a standardized culture. Final volume in each tube or cup in the Dis Poso tray is 1.0 ml. The tubes are incubated at 37° C. for approximately 24 hours. The medium used is Witkins synthetic or Brain Heart Infusion (BHI). The sensitivity (MIC—minimal inhibitory concentration) of the test organism is accepted as evidenced by the absence of gross turbidity.

Further, compounds of Formula II, described herein, exhibit broad spectrum activity, that is, activity against both Gram-negative and Gram-positive bacteria, in contrast to the usual Gram-negative activity of quinoxaline-di-N-oxides. Additionally, they are active in vivo and are especially useful as animal growth promotants, especially for swine and poultry.

When used in vivo for such purposes, these novel compounds can be administered orally or parenterally, e.g., by subcutaneous, intramuscular, or intravenous injection, at a dosage of from about 1 mg./kg. to about 100 mg./kg. of body weight. Vehicles suitable for parenteral injection may be either aqueous such as water, isotonic saline, isotonic dextrose, Ringer's solution, or non-aqueous such as fatty oils of vegetable origin (cottonseed, peanut oil, corn, sesame), dimethylsulfoxide and other non-aqueous vehicles which will not interfere with therapeutic efficiency of the preparation and are nontoxic in the volume or proportion used (glycerol, propylene glycol, sorbitol and dimethylacetamide). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, hyaluronidase, local anesthetics and inorganic salts to afford desirable pharmacological properties. These compounds may also be combined with various pharmaceutically-acceptable inert carriers including solid diluents, aqueous vehicles, nontoxic organic solvents in the form of capsules, tablets, lozenges, troches, dry mixes, suspensions, solutions, elixirs and parenteral solutions or suspensions. In general, the compounds are used in various dosage forms at concentration levels ranging from about 0.5 percent to about 90 percent by weight of the total composition.

The in vivo efficacy of the compound of Formula II of the instant invention is determined by the antibacterial activity against acute infections in mice. The acute experimental infections are produced by the intraperitoneal inoculation of standardized culture suspended in either 5% hog gastric mucin or broth. A brief discussion of the words "standardized culture" would seem to be beneficial. In order to obtain reproducible results with a test compound it is necessary to control, as much as possible, the many variables that can enter into this type of test. An organism of high virulence if used in large enough numbers can make almost any drug look inactive. On the other hand, an inoculum not able to produce a measurable difference between treated and untreated groups is equally lacking in purpose.

Stock cultures of test organisms are normally maintained on slants or in liquid medium. When not routinely used they are maintained at refrigerator temperature or in a lyophilized state. When it becomes necessary to use a culture in animal protection tests the culture is suspended in a volume of saline or broth, and the density of the suspension is measured by a photoelectric colorimeter. From this stock, ten-fold dilutions are prepared. Each dilution is inoculated into a series of mice in order to determine the $LD_{100}$, $LD_{100}$ being the lowest concentration of organisms required to produce 100 percent deaths. For example, if it is found that a dilution of $10^{-4}$ is the lowest level of organism that will produce 100 percent death, an inoculum of $10^{-3}$ would probably be used for the drug evaluation experiments. This means that we are using about 10 $LD_{100}$ or ten times the minimum dose required to kill mice. Such a test would also include the use of control animals which receive an inoculum of $10^{-4}$, $10^{-5}$, and possibly $10^{-6}$. These dilutions are included as a check on possible variation in virulence which can occur. Having previously determined, through the virulence titration, that $10^{-4}$ was the maximum dilution that will kill we naturally expect these animals to die, usually within 24 hours.

Each organism has its own standardized inoculum level. Some, such as Staphylococcus, may be used at $10^{-1}$, while other like Streptococcus require weekly animal passage in order to maintain virulence.

When evaluating an antibiotic for its effectiveness after a single dose, the dose is usually administered 0.5 hour after inoculating the mice with the lethal concentration of organisms. In this type of treatment schedule surviving mice are usually held for four days after the treatment and the percent alive is calculated.

Other methods of administration of the useful products of this invention to animals include mixing with animal feeds, the preparation of feed concentrates and supplements and dilute solutions or suspensions, e.g., a 0.1 percent solution, for drinking purposes. The addition of a low level of one or more of the herein described quinoxaline-di-N-oxides to the diet of healthy animals, both ruminant and non-ruminant, such that these animals receive the product over an extended period of time, at a level of from about 0.1 mg./kg. to about 100 mg./kg. of body weight per day, especially over a major portion of their active growth period, results in an acceleration of the rate of growth and improves feed efficiency (the number of pounds of feed required to produce a pound gain in weight). Included in these two classes of animals are poultry (chickens, ducks, turkeys), cattle, sheep, dogs, cats, swine, rats, mice, horses, goats, mules, rabbits, mink, etc. The beneficial effects in growth rate and feed efficiency are over and above what is normally obtained with complete nutritious diets containing all the nutrients, vitamins, minerals, and other factors known to be required for the maximum healthy growth of such animals. The animals thus attain market size sooner and on less feed.

The herein described feed compositions have been found to be particularly valuable and outstanding in the case of swine. In some instances the degree of response may vary with respect to the sex of the animals. The products may, of course, be administered in one component of the feed or they may be blended uniformly throughout a mixed feed; alternatively as noted above, they may be administered in an equivalent amount via the animal's water ration. It should be noted that a variety of feed components may be of use in the nutritionally balanced feeds. Any animal feed composition may be prepared to comprise the usual nutritional balance of energy, proteins, minerals and vitamins together with one or more of the quinoxaline-di-N-oxides described above. Some of the various components are commonly grains such as ground grain and grain by-products; animal protein substances, such as meat and fish by-products; vitaminaceous mixtures, e.g., vitamin A and D mixtures, riboflavin supplements and other vitamin B complexes; and bone meal, limestone and other inorganic compounds to provide minerals.

The relative proportions of the present compounds in feeds and feed concentrates may vary somewhat, depending upon the compound, the feed with which they are employed and the animal consuming the same. These substances are advantageously combined in such relative proportions with edible carriers as to provide pre-mixes or concentrates which may readily be blended with standard nutritionally balanced feeds or which may be used themselves as an adjunct to normal feedings.

In the preparation of concentrates a wide variety of carriers, including the following: soybean oil meal, corn gluten meal, cottonseed oil meal, sunflower meal, linseed oil meal, cornmeal, limestone and corncob meal can be employed. The carrier facilitates uniform distribution of the active materials in the finished feed with which the concentrate is blended. The concentrate may be surface coated, if desired, with various protenaceous materials, or edible waxes, such as zein, gelatin, microcrystalline wax and the like to provide a protective film which seals in the active ingredients. It will be appreciated that the proportions of the drug preparation in such concentrates are capable of wide variation since the amount of active materials in the finished feed may be adjusted by blending the appropriate proportion of concentrate with the feed to obtain the desired degree of supplementation. In the preparation of high potency concentrates, i.e., pre-mixes, suitable for blending by feed manufacturers to produce finished feeds or concentrates of lower potency, the drug content may range from about 0. g. to 50 g. per pound of concentrate. The high potency concentrates may be blended by the feed manufacturer with proteinaceous carriers, such as soybean oil meal, to produce concentrated supplements which are suitable for direct feeding to animals. The proportion of the drug in these supplements may vary from about 0.1 to 10 g. per pound of supplement. A particularly useful concentrate is provided by blending 2 g. of drug with 1 pound of limestone or 1 pound of limestone-soybean oil meal (1:1). Other dietary supplements, such as vitamins, minerals, etc., may be added to the concentrates in the appropriate circumstances.

The concentrates described may also be added to animal feeds to produce a nutritionally balanced, finished feed containing from about 5 to about 125 g. of the herein described compounds per ton of finished feed. In the case of ruminants, the finished feed should contain protein, fat, fiber, carbohydrate, vitamins and minerals, each in an amount sufficient to meet the nutritional requirments of the animal for which the feed is intended. Most of these substances are present in naturally occurring feed materials, such as alfalfa hay or meal, cracked corn, whole oats, soybean oil meal, corn silage, ground corn cobs, wheat bran and dried molasses. Bone meal, limestone, iodized salt and trace minerals are frequently added to supply the necessary minerals and urea to provide additional nitrogen.

As is well known to those skilled in the art, the types of diets are extremely variable depending upon the purpose, type of feeding operation, species, etc. Specific diets for various purposes are listed by Morrison in the appendix of "Feeds and Feeding," the Morrison Publishing Company, Clinton, Iowa, 1959.

In the case of non-ruminant animals, such as hogs, a suitable feed may contain from about 50 to 80 percent of grains, 3 to 10 percent animal protein, 5 to 30 percent vegetable protein, 2 to 4 percent of minerals, together with supplementary vitaminaceous sources.

In practice, growth promotion is determined in swine, for instance, by the method wherein young pigs from 5–6 weeks of age and averaging 21.5 lbs. initial body weight are maintained on an ad libitum consumption of water and feed formulation consisting of ground yellow corn (58.1%), soybean meal (19.6%), alfalfa meal (2.0%), dried skim milk (5.0%), dried whey (10.0%), stabilized animal fat (2.5%), limestone (0.6%), dicalcium phosphate (1.1%), iodized salt (0.5%), vitamin premix PPM #5 (0.5%), quadruple delamix (0.05%), and zinc carbonate (156 g./2000 lbs. mix). The pigs are divided into groups of 32 pigs each and are held for a pre-experimental period of three days prior to starting the experiment. The quinoxaline-di-N-oxides of the present invention are added to the feed at a ratio of 50 g. of compound per ton of feed. After 28 days the efficacy of said added compounds on growth promotion is measured by a comparison of the growth in terms of weight gain of the treated animals with the untreated control group, which is arbitrarily assigned a weight gain index of 100. For example, if a compound effects a growth 23% greater than the control group (with a value of 100) it would be assigned a value of 123, etc.

The effect of a supplemented diet on the growth promotion in other species of animals using appropriate dose levels and feed formulations is assessed in an analogous manner.

The following examples are provided solely for the purpose of illustration and are not to be construed as limitations of this invention, many variations of which are possible without departing from the spirit or the scope thereof.

EXAMPLE I 3-bromomethyl-2-quinoxalinecarboxylic acid, ethyl ester 1,4-dioxide To a solution of 248.0 g. (1.0 mole) of 3-methyl-2-quinoxalinecarboxylic acid, ethyl ester 1,4-dioxide in 1400 ml. of dimethylformamide and warmed to 80° C. is added 161 g. (1.01 moles) of bromine in 100 ml. of chloroform over a period of 3 minutes. The temperature of the reaction, which rises to 108° C., is allowed to return to 80–85° C. where it is maintained for an additional 30 minutes. The reaction mixture is then poured into 2 liters of ice and water and stirred until crystallization is complete. The desired product is filtered, washed with water and air dried, 249 g., M.P. 108–111° C. Recrystallization from dimethylformamide-water provides the pure product, M.P. 126° C.

EXAMPLE II 3-bromomethyl-6- and 7-chloro-2-quinoxalinecarboxylic acid, ethyl ester 1,4-dioxide To 500 ml. of dimethylformamide containing 110 g. (0.39 mole) of 3-methyl-6- and 7-chloro-2-quinoxalinecarboxylic acid, ethyl ester 1,4-dioxide and heated to 90° C. is added over a period of 3 minutes 62 g. (0.39 mole) of bromine in 60 ml. of methylene chloride. The reaction mixture is allowed to stir at this temperature for 30 minutes after which it is added to 2.5 liters of ice and water. The resulting precipitate is filtered, washed with water and oven dried, 106 g.

EXAMPLE III

Employing the procedures of Examples I and II, and starting with the appropriate starting materials, the following compounds are prepared:

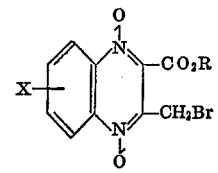

| X: | R |
|---|---|
| H | $CH_3$ |
| H | $n\text{-}C_3H_7$ |
| H | $i\text{-}C_3H_7$ |
| $CH_3$ | $CH_3$ |
| $CH_3$ | $C_2H_5$ |
| $CH_3$ | $i\text{-}C_3H_7$ |
| Br | $CH_3$ |
| Br | $n\text{-}C_3H_7$ |
| Br | $i\text{-}C_3H_7$ |
| F | $CH_3$ |
| F | $C_2H_5$ |
| F | $n\text{-}C_3H_7$ |
| F | $i\text{-}C_3H_7$ |
| $OCH_3$ | $CH_3$ |
| $OCH_3$ | $C_2H_5$ |
| $OCH_3$ | $n\text{-}C_3H_7$ |
| $CF_3$ | $CH_3$ |
| $CF_3$ | $C_2H_5$ |
| Cl | $C_2H_5$ |
| Cl | $n\text{-}C_3H_7$ |
| Cl | $i\text{-}C_3H_7$ |

EXAMPLE IV 3-chloromethyl-2-quinoxalinecarboxylic acid, ethyl ester 1,4-dioxide To 24.8 g. (0.1 mole) of 3-methyl-2-quinoxalinecarboxylic acid, ethyl ester 1,4-dioxide contained in 100 ml. of dimethylformamide at 85–90° C. is added 7.8 g. (0.11 mole) of chlorine gas dissolved in 200 ml. of chloroform over a period of 2–3 minutes. The reaction is maintained at this temperature for an additional 35 minutes and is then poured into 1 liter of ice and water. The cold mixture is allowed to stir until the crystallization of the product is complete. The supernatant is decanted from the precipitate and the solids triturated with cold water and filtered. After air-drying the desired product is recrystallized from dimethylformamide-water.

EXAMPLE V

Using the procedure of Example IV and employing the requisite starting materials, the following analogs are prepared:

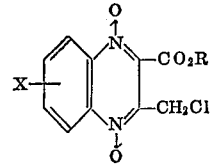

| X: | R |
|---|---|
| H | CH₃ |
| H | n-C₃H₇ |
| Cl | CH₃ |
| Cl | C₂H₅ |
| F | C₂H₅ |
| F | n-C₃H₇ |
| F | i-C₃H₇ |
| Br | CH₃ |
| CF₃ | CH₃ |
| CF₃ | C₂H₅ |
| CF₃ | n-C₃H₇ |
| CH₃ | CH₃ |
| OCH₃ | C₂H₅ |
| OCH₃ | n-C₃H₇ |

EXAMPLE VI 2-methyl-2,3-dihydro-1-oxo-1H-pyrrolo[3,4-b]quinoxaline-4,9-dioxide Methylamine gas is bubbled into a cold (10–13° C.) solution of 4 litres of acetonitrile containing 250 g. (0.77 mole) of 3 - bromomethyl-2-quinoxalinecarboxylic acid, ethyl ester 1,4-dioxide. After a short period of time, a voluminous precipitate starts to form. Treatment with the methylamine is continued until the precipitation of the product is complete. The solids are filtered, slurried in boiling methanol and refiltered, 203 g. A small sample is recrystallized from acetonitrile, M.P. 199–200° C.

*Analysis.*—Calcd. for $C_{11}H_9N_3O_3$ (percent): C, 57.14; H, 3.92; N, 18.18. Found (percent): C, 56.74; H, 3.84; N, 18.01.

EXAMPLE VII

Employing the general procedure of Example VI, and starting with the appropriate quinoxaline-di-N-oxide and amine, the following congeners are prepared:

2,3-dihydro-1-oxo-1H-pyrrolo[3,4-b]-4,9-dioxide, M.P. 183–184° C.

2-ethyl-2,3-dihydro-1-oxo-1H-pyrrolo[3,4-b]-4,9-dioxide, M.P. 193–194° C.

2-(2-hydroxyethyl)-2,3-dihydro-1-oxo-1H-pyrrolo[3,4-b]-4,9-dioxide, M.P. 186–187° C.

2-(2-ethoxyethyl)-2,3-dihydro-1-oxo-1H-pyrrolo[3,4-b]-4,9-dioxide, M.P. 159–160° C.

2-allyl-2,3-dihydro-1-oxo-1H-pyrrolo[3,4-b]-4,9-dioxide, M.P. 166–167° C.

2-cyclopentyl-2,3-dihydro-1-oxo-1H-pyrrolo[3,4-b]-4,9-dioxide, M.P. 215° C.

2-benzyl-2,3-dihydro-1-oxo-1H-pyrrolo[3,4-b]-4,9-dioxide, M.P. 192–193° C.

2-(2-dimethylaminoethyl)-2,3-dihydro-1-oxo-1H-pyrrolo[3,4-b]-4,9-dioxide, M.P. 105–125° C.

2-(3-hydroxypropyl)-2,3-dihydro-1-oxo-1H-pyrrolo[3,4-b]-4,9-dioxide, M.P. 188–189° C.

2-(2,3-dihydroxypropyl)-2,3-dihydro-1oxo-IH-pyrrolo[3,4-b]-4,9-dioxide, M.P. 143–145° C.

2-(2-phenethyl)-2,3-dihydro-1-oxo-1H-pyrrolo[3,4-b]-4,9-dioxide, M.P. 174–175° C.

EXAMPLE VIII

Again, employing the procedure of Example VI and starting with the appropriately substituted quinoxaline-di-N-oxide and the following compounds are prepared:

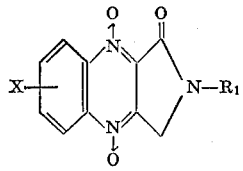

| X: | R₁ |
|---|---|
| H | n-C₃H₇ |
| H | i-C₃H₇ |
| Cl | H |
| Cl | CH₃ |
| Cl | C₂H₅ |
| Cl | i-C₃H₇ |
| CH₃ | H |
| CH₃ | C₂H₅ |
| CH₃ | n-C₃H₇ |
| CH₃ | i-C₃H₇ |
| OCH₃ | CH₃ |
| OCH₃ | C₂H₅ |
| OCH₃ | n-C₃H₇ |
| OCH₃ | i-C₃H₇ |
| Br | CH₂ |
| Br | C₂H₅ |
| Br | n-C₃H₇ |
| F | CH₃ |
| F | C₂H₅ |
| F | n-C₃H₇ |
| F | i-C₃H₇ |
| CF₃ | C₂H₅ |
| CF₃ | n-C₃H₇ |
| CF₃ | i-C₃H₇ |

EXAMPLE IX

Starting with the appropriately substituted 3-chloromethyl-2-quinoxalinecarboxylic acid, n-propyl ester 1,4-dioxide and the requisite amine, the procedure of Example VI is again repeated to provide the following congeners:

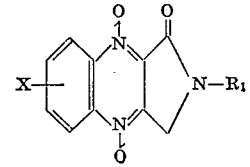

| X: | R₁ |
|---|---|
| H | H |
| H | CH₃ |
| H | C₂H₅ |
| H | n-C₃H₇ |
| H | i-C₃H₇ |
| F | CH₃ |
| F | C₂H₅ |
| F | n-C₃H₇ |
| CH₃ | CH₃ |
| CH₃ | C₂H₅ |
| OCH₃ | H |
| OCH₃ | CH₃ |
| OCH₃ | n-C₃H₇ |
| OCH₃ | i-C₃H₇ |
| Cl | H |
| Cl | CH₃ |
| Cl | C₂H₅ |
| Br | CH₃ |
| Br | C₂H₅ |
| CF₃ | H |
| CF₃ | CH₃ |
| CF₃ | C₂H₅ |
| CF₃ | n-C₃H₇ |

EXAMPLE X 2-methyl-2,3-dihydro-1-oxo-1H-pyrrolo[3,4-b]quinoxoline 4,9-dioxide To 11.3 g. (0.1 mole) of 1-methyl-3-hydroxy-3-pyrrolin-5-one dissolved in 50 ml. of ethanol containing 1.36 g. (0.02 mole) of sodium ethoxide is added, in portions, 13.6 g. (0.1 mole) of benzofuroxan. The reaction temperature is allowed to rise to 40° C., where it is maintained with intermittent cooling during the addition. The reaction mixture is heated to reflux until the reaction is complete, and is then cooled in an ice bath. The resulting product is filtered, dried and recrystallized from dimethylformamide-water. The product is identical in every respect with that prepared in Examples VII and IX.

EXAMPLE XI

Starting with the appropriately substituted reagents and utilizing the procedure of Example X the following quinoxaline-di-oxides are synthesized:

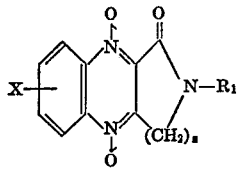

| X | Z | R₁ | X | Z | R₁ |
|---|---|---|---|---|---|
| H | 1 | C₂H₅ | OCH₃ | 1 | CH₃ |
| H | 3 | n-C₃H₇ | OCH₃ | 3 | C₃H₅ |
| Cl | 2 | CH₃ | Br | 2 | CH₃ |
| Cl | 1 | C₂H₅ | CH₃ | 2 | CH₃ |
| Cl | 1 | n-C₃H₇ | CH₃ | 3 | C₂H₅ |
| F | 3 | CH₃ | CF₃ | 3 | CH₃ |
| F | 2 | C₂H₅ | CF₃ | 1 | C₂H₅ |
| F | 2 | n-C₃H₇ | | | |
| H | 1 | CH₂CF₃ | | | |
| H | 2 | (CH₂)₂CF₃ | | | |
| H | 3 | CH₂CF₂CF₃ | | | |

EXAMPLE XII

Employing the procedures of Examples VI and X, and utilizing the appropriate starting materials, the following analogs are prepared:

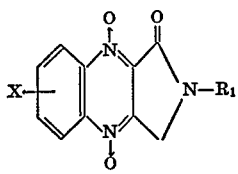

| X | R₁ | X | R₁ |
|---|---|---|---|
| H | CF₃CH₂— | Br | CH₃(CF₃)CH— |
| H | C₆H₅(CH₂)₂— | CH₃ | CF₃CH₂— |
| H | (CH₃)₂N(CH₂)₃— | CH₃ | n-C₃H₇O(CH₂)₃— |
| Cl | CF₃(CH₂)₂— | CH₃ | C₂H₅O₂C(CH₂)₃— |
| Cl | C₂H₅O₂CCH₂— | CH₃ | CH₃NHCO(CH₂)₂— |
| Cl | (CH₃)₂NCOCH₂— | OCH₃ | C₆H₅— |
| Cl | i-C₃H₇O(CH₂)₂— | OCH₃ | CF₃CH₂— |
| F | CF₃CF₂CH₂— | OCH₃ | CF₃(CH₃)CH— |
| F | C₆H₅— | OCH₃ | cyclo-C₅H₉(CH₂)₂— |
| F | (CH₃)₂C=CHCH₂— | | |
| Br | cyclo-C₆H₁₁CH₂— | | |
| Br | ⌬—CH₂— | | |

EXAMPLE XIII

Employing the aforedescribed two-fold serial dilution technic, the in vitro activity of some of the products of the instant invention against *Staphylococcus aureus* and *Escherichia coli* are presented. Benzylpenicillin (K salt) when tested gave MIC (minimal inhibitory concentration) values of 0.156 and >100 vs. *S. aureus* and *E. coli*, respectively.

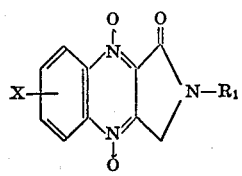

| X | R₁ | S. aureus | E. coli |
|---|---|---|---|
| Cl | H | 50 | >200 |
| H | CH₃ | 50 | 12.5 |
| Cl | CH₃ | 50 | 12.5 |
| H | C₂H₅ | 6.25 | 3.12 |
| Cl | C₂H₅ | 100 | 50 |

EXAMPLE XIV

Using the previously described method for determining in vivo activity, the following compounds were tested orally against *Streptococcus pyogenes* at 200 and 50 mg./kg. and against *Escherichia coli* at 100, 50 and 25 mg./kg., the results being recorded as the percent animals which survived:

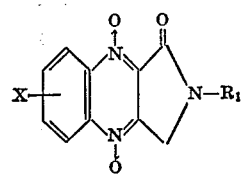

| | | S. pyogenes | | E. coli | | |
|---|---|---|---|---|---|---|
| X | R₁ | 200 | 50 | 100 | 50 | 25 |
| H | H | 20 | 0 | 100 | | 40 |
| H | CH₃ | 80 | 80 | | 100 | 20 |
| H | C₂H₅ | (Toxic) | 100 | 40 | | 0 |
| Cl | H | 0 | 0 | 0 | 0 | 0 |
| Cl | CH₃ | 60 | 40 | 40 | | 0 |
| Cl | C₂H₅ | 40 | 0 | 0 | 0 | 0 |

EXAMPLE XV

Employing the previously described procedure for determining growth promotion in animals, 2-methyl-2,3-dihydro - 1 - oxo - 1H - pyrrolo[3,4-b]quinoxaline-4,9-dioxide was tested at 50 g./ton of feed in swine for a period of 28 days and provided the following results:

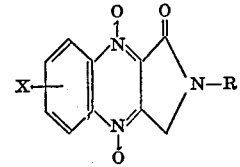

| | |
|---|---|
| X | H |
| R₁ | CH₃ |
| Weight gain index [1] | 145 |
| Percent growth over control | 45 |

EXAMPLE XVI

The efficacy of the herein described compounds in protecting against a systemic challenge infection of *Salmonella choleraesuis* var. *kunzendorf* in swine is exemplified by the following experiment. Young, 6–8 week old pigs are conditioned for fourteen days in isolation rooms and maintained during the entire study on a basal ration consisting of ground yellow corn (78.4%), soybean meal (15%), alfalfa meal (2%), meat bone scraps (2.5%), limestone (0.4%), dicalcium phosphate (0.65%), iodized salt (0.5%), vitamin pre-mix PPM #5 (0.5%), quadruple delamix (0.05%) and zinc carbonate (7.8 g./100 lbs. mix). All the pigs, which are divided into groups of six, are inoculated on day 0 with 4 ml. (approximately $2.0 \times 10^8$ organisms) of the stock inoculating suspension. Treatment with the quinoxaline-di-N-oxides of the present invention is carried out on day 0 and day 1 by intramuscular injection at 12 hour intervals at doses of 2.5 and 5 mg./kg. On day 10 the percent mortality in each group is calculated. The following results are obtained.

| Medication: | Percent mortality |
|---|---|
| Infected, non-medicated (placebo injection) | 83 |
| 2 - methyl - 2,3 - dihydro - 1 - oxo-1H-pyrrolo-[3,4-b]quinoxaline-4,9-dioxide— | |
| 2.5 mg./kg. ×4 | 33 |
| 5.0 mg./kg. ×4 | 0 |

PREPARATION A

3-methyl-2-quinoxalinecarboxylic acid, alkyl ester 1,4-dioxides (a) 3-methyl-2-quinoxalinecarboxylic acid, ethyl ester 1,4-dioxide.—To a stirred solution of 910 g. (7.0 moles) of ethyl acetoacetate in 3 liters of ethanol is added 1.4 liters of a 1 N solution of sodium ethoxide in ethanol (1.4 moles) followed by 952 g. (7.0 moles) of benzofuroxan in 30–40 g. portions. The temperature of the reaction mixture is allowed to rise to 40° and is maintained at that temperature by intermittent cooling in an ice bath. After the reaction is allowed to stir at room temperature for 2 hours, it is refluxed for an additional 16 hours and cooled in an ice bath. The precipitated product is filtered, washed with ethanol and dried, 996 g., M.P. 135–137° C.

(b) General procedure.—To an ethanol solution of the requisite alkyl acetoacetate containing the basic catalyst, sodium ethoxide, is added an equimolar amount of the appropriately substituted benzofuroxan at such a rate that the temperature of the reaction mixture is easily maintained at 35–40° C. by occasional cooling with an ice bath. The reaction is brought to completion by limited heating at the reflux temperature for 6–20 hours, which is then followed by cooling in an ice bath to precipitate the final product.

The following compounds of the formula

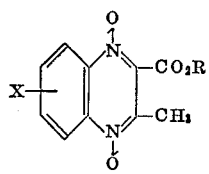

are prepared.

| X: | R |
|---|---|
| H | $CH_3$ |
| H | $C_2H_5$ |
| H | $n\text{-}C_3H_7$ |
| H | $i\text{-}C_3H_7$ |
| $CH_3$ | $CH_3$ |
| $CH_3$ | $C_2H_5$ |
| $CH_3$ | $n\text{-}C_3H_7$ |
| $CH_3$ | $i\text{-}C_3H_7$ |
| $OCH_3$ | $CH_3$ |
| $OCH_3$ | $C_2H_5$ |
| $OCH_3$ | $n\text{-}C_3H_7$ |
| F | $CH_3$ |
| F | $C_2H_5$ |
| F | $n\text{-}C_3H_7$ |
| F | $i\text{-}C_3H_7$ |
| Cl | $CH_3$ |
| Cl | $C_2H_5$ |
| Cl | $n\text{-}C_3H_7$ |
| Cl | $i\text{-}C_3H_7$ |
| Br | $CH_3$ |
| Br | $n\text{-}C_3H_7$ |
| Br | $i\text{-}C_3H_7$ |
| $CF_3$ | $CH_3$ |
| $CF_3$ | $C_2H_5$ |
| $CF_3$ | $n\text{-}C_3H_7$ |

PREPARATION B

1-methyl-3-hydroxy-3-pyrrolin-5-one (A) N-methyl - N - carbomethoxyacetylglycine ethyl ester.—To a solution of 58.5 g. of N-methylglycine ethyl ester and 73.2 ml. of triethylamine in 300 ml. of tetrahydrofuran, and cooled to −40° C., is added dropwise 68.3 g. of carbomethoxyacetyl chloride. The resulting reaction mixture is stirred at −40° C. for 20 minutes and then allowed to warm to room temperature. The solids are filtered and the filtrate evaporated to dryness. The residue is dissolved in 200 ml. of chloroform washed with 30 ml. of aqueous potassium carbonate solution. The chloroform layer is separated, evaporated to dryness and the residue fractionally distilled, 88.5 g., B.P. 108–111° C. (0.01 mm.).

(B) 1 - methyl-3-hydroxy-3-pyrrolin-4-carbomethoxy-5-one.—To 0.015 mole of sodium methoxide is 50 ml. of absolute methanol is added dropwise 21.7 g. of N-methyl-N-carbomethoxyacetylglycine ethyl ester in 100 ml. of absolute ethanol. The resulting solution is heated to reflux for 5 minutes and is then evaporated in vacuo to dryness. The residue is dissolved in a small volume of water, washed with chloroform and the water layer acidified with 12 N hydrochloric acid. The product is extracted with chloroform and the solvent evaporated to dryness to give 15.9 g. of the desired product, M.P. 212° C., dec.

(C) 1-methyl-3-hydroxy-3-pyrrolin-5-one.—A suspension of 17.1 g. of 1-methyl-3-hydroxy-3-pyrrolin-4-carbomethoxy-5-one in 50 ml. of water is heated to reflux and maintained at that temperature until the evolution of carbon dioxide ceases. On cooling there is deposited the desired product which is filtered and dried, 10.1 g., M.P. 234° C.

The following lactams of the formula

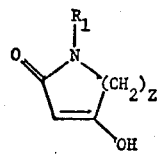

not previously reported in the literature are synthesized by the aforementioned procedure, which is essentially the method of Schmidt et al., Ann., 664, 168 (1963):

Z=1; $R_1$=H, $C_2H_5$, n-$C_3H_7$, and i-$C_3H_7$.
Z=2; $R_1$=$CH_3$, $C_2H_5$, n-$C_3H_7$, and $CF_3CH_2CH_2$—.
Z=3; $R_1$=$CH_3$, $C_2H_5$, n-$C_3H_7$, and $CF_3CH_2CH_2$—.

What is claimed is:

1. A method for promoting growth and improving feed efficiency of an animal which comprises orally or parenterally administering to said animal a dosage amount of from about 1 mg./kg. to about 100 mg./kg. body weight per day over a major portion of the animal's active growth period of a compound of the formula:

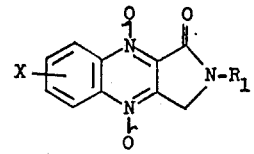

wherein X is a substituent at the 6- or 7-position selected from the group consisting of hydrogen, methoxy, trifluoromethyl, bromine, chlorine and fluorine and $R_1$ is hydrogen or alkyl of from 1 to 3 carbon atoms.

2. The method of claim 1 wherein said compound is administered to said animal in admixture with a nutritionally balanced animal feed, said feed containing said compound in an amount whereby the average daily ration of the animal supplies said dosage amount.

3. A method for promoting growth and improving feed efficiency of a healthy animal which comprises orally or parenterally administering to said animal a dosage amount of from about 1 mg./kg. to about 100 mg./kg. of body weight per day over a major portion of the animal's active growth period of a compound selected from the group consisting of 2,3 - dihydro-1-oxo-1H-pyrrolo[3,4-b]quinoxaline-4,9-dioxide and 2-methyl-2,3-dihydro-1-oxo-1H-pyrrolo[3,4-b]quinoxaline-4,9-dioxide.

4. The method of claim 3 wherein said compound is 2,3-dihydro-1-oxo - 1H - pyrrolo[3,4-b]quinoxaline-4,9-dioxide.

5. The method of claim 3 wherein said compound is 2-methyl-2,3-dihydro-1-oxo-1H-pyrrolo[3,4-b]quinoxaline-4,9-dioxide.

6. The method of claim 3 wherein said compound is orally administered to said animal in admixture with a nutritionally balanced animal feed, said feed containing said compound in an amount whereby the average daily ration of the animal supplies said dosage amount.

7. The method of claim 6 wherein said compound is 2,3-dihydro-1-oxo - 1H - pyrrolo[3,4-b]quinoxaline-4,9-dioxide.

8. The method of claim 6 wherein said compound is 2-methyl-2,3-dihydro-1-oxo-1H-pyrrolo[3,4 - b]quinoxaline-4,9-dioxide.

References Cited
UNITED STATES PATENTS
3,371,090  2/1968  Johnston _____ 260—240

ALBERT T. MEYERS, Primary Examiner
F. E. WADDELL, Assistant Examiner

UNITED STATES PATENT OFFICE
CERTIFICATE OF CORRECTION

Patent No. 3,773,950          Dated November 20, 1973

Inventor(s)   Timothy Henry Cronin et al

It is certified that error appears in the above-identified patent and that said Letters Patent are hereby corrected as shown below:

Col. 8, line 55, "0 g." should read -- 0.1 g. --.

Col. 16, line 5, "0.015" should read -- 0.105 --.

Signed and sealed this 8th day of October 1974.

(SEAL)
Attest:

McCOY M. GIBSON JR.
Attesting Officer

C. MARSHALL DANN
Commissioner of Patents